United States Patent
Petkov et al.

(10) Patent No.: US 9,117,060 B2
(45) Date of Patent: Aug. 25, 2015

(54) SYSTEM AND METHOD FOR PREVENTING PROPER EXECUTION OF AN APPLICATION PROGRAM IN AN UNAUTHORIZED PROCESSOR

(75) Inventors: Darin S. Petkov, Sunnyvale, CA (US); Dror E. Maydan, Palo Alto, CA (US); Pushkar G. Patwardhan, Pune (IN); Sachin P. Ghanekar, Pune (IN); Samir S. Pathak, Pune (IN)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 1287 days.

(21) Appl. No.: 12/436,862

(22) Filed: May 7, 2009

(65) Prior Publication Data

US 2010/0287622 A1    Nov. 11, 2010

(51) Int. Cl.
*G06F 17/30*    (2006.01)
*H04N 7/16*    (2011.01)
*G06F 21/12*    (2013.01)

(52) U.S. Cl.
CPC .................................. *G06F 21/125* (2013.01)

(58) Field of Classification Search
CPC ....................................................... G06F 21/00
USPC .......................................................... 726/29
See application file for complete search history.

(56) References Cited

U.S. PATENT DOCUMENTS

| 4,385,363 | A * | 5/1983 | Widergren et al. | 708/402 |
|---|---|---|---|---|
| 8,191,158 | B2 * | 5/2012 | Ginter et al. | 726/27 |
| 2001/0047517 | A1 * | 11/2001 | Christopoulos et al. | 725/87 |
| 2004/0264580 | A1 * | 12/2004 | Chiang Wei Yin et al. | 375/240.25 |
| 2005/0152609 | A1 * | 7/2005 | Wang et al. | 382/233 |
| 2007/0156598 | A1 * | 7/2007 | Yoon et al. | 705/52 |
| 2007/0198851 | A1 * | 8/2007 | Goto | 713/187 |
| 2007/0209072 | A1 * | 9/2007 | Chen | 726/16 |
| 2007/0265978 | A1 * | 11/2007 | Kahn et al. | 705/59 |
| 2007/0266414 | A1 * | 11/2007 | Kahn et al. | 725/113 |
| 2008/0033881 | A1 * | 2/2008 | Ficco | 705/51 |
| 2008/0209576 | A1 * | 8/2008 | Nooning | 726/29 |

FOREIGN PATENT DOCUMENTS

WO    WO 2008023023 A1 *    2/2008    ............. H04N 7/167

* cited by examiner

*Primary Examiner* — James A Reagan
(74) *Attorney, Agent, or Firm* — Sawyer Law Group, P.C.

(57) ABSTRACT

A system and method for preventing an application program, which is licensed to a customer to be exclusively executed in a processor based on a certain processor design, from being executed properly in unauthorized processors is provided. The system includes a scrambling module and a recovery module. The scrambling module scrambles a selected portion of the application program using an identifier which identifies the authorized processor design. The recovery module adds an unscrambling program to the application program such that when the program is running in a processor, it retrieves a second identifier from the processor and unscrambles the scrambled portion of the application program using the retrieved second identifier. If the second identifier does not correspond to an authorized processor design, the unscrambling operation will incorrectly unscramble the scrambled portion and the application program will not run properly.

10 Claims, 3 Drawing Sheets

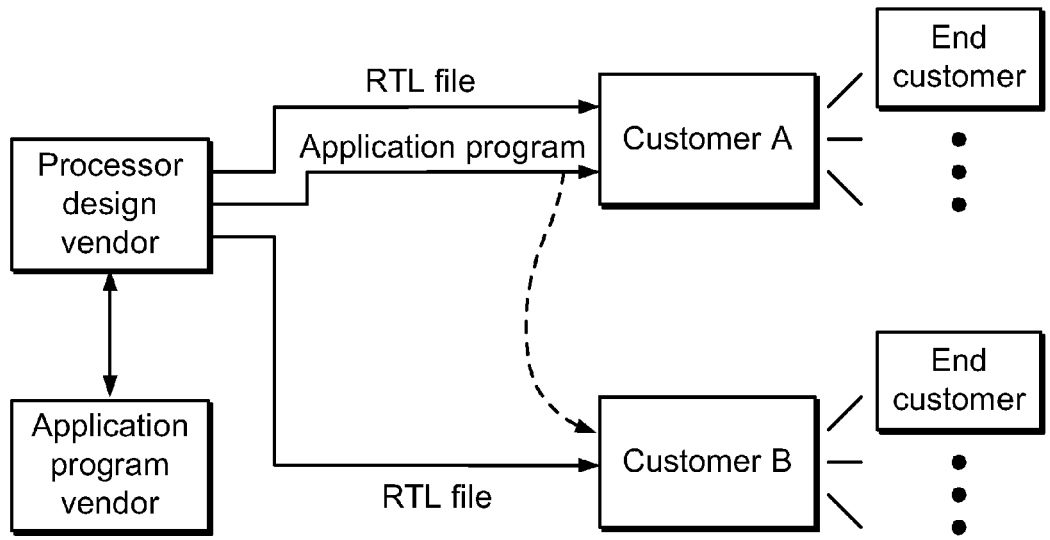
F I G. 1
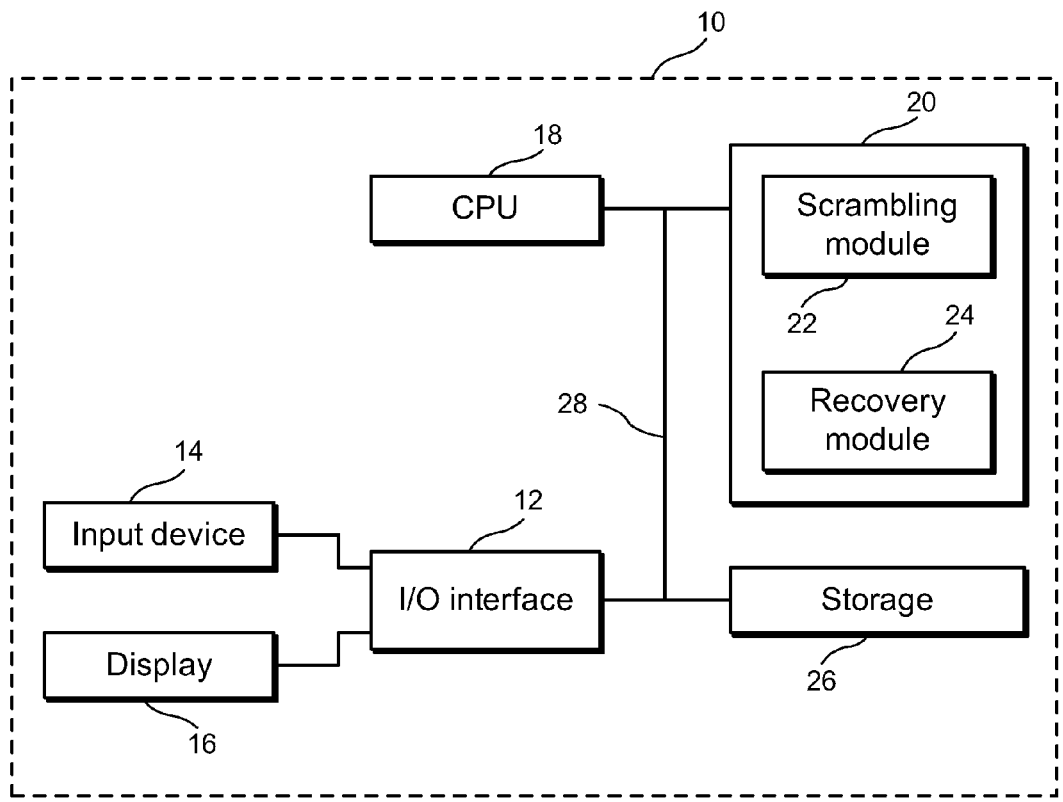
F I G. 2

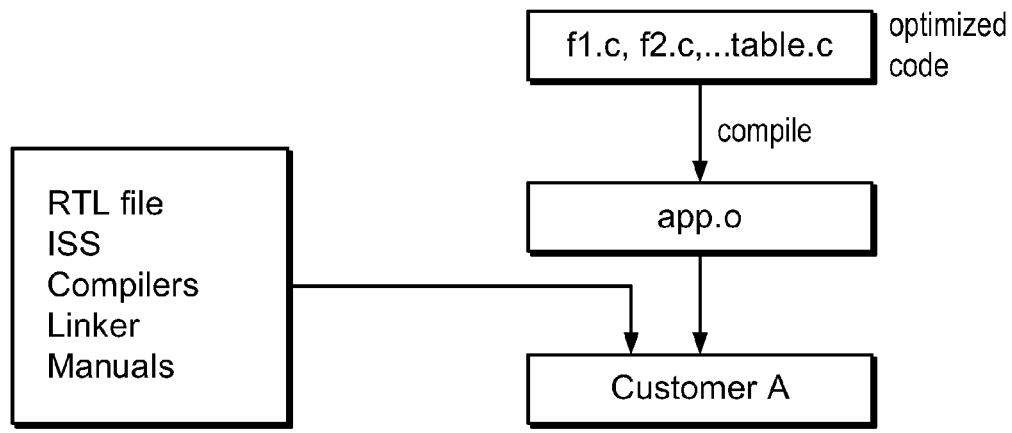
F I G. 3
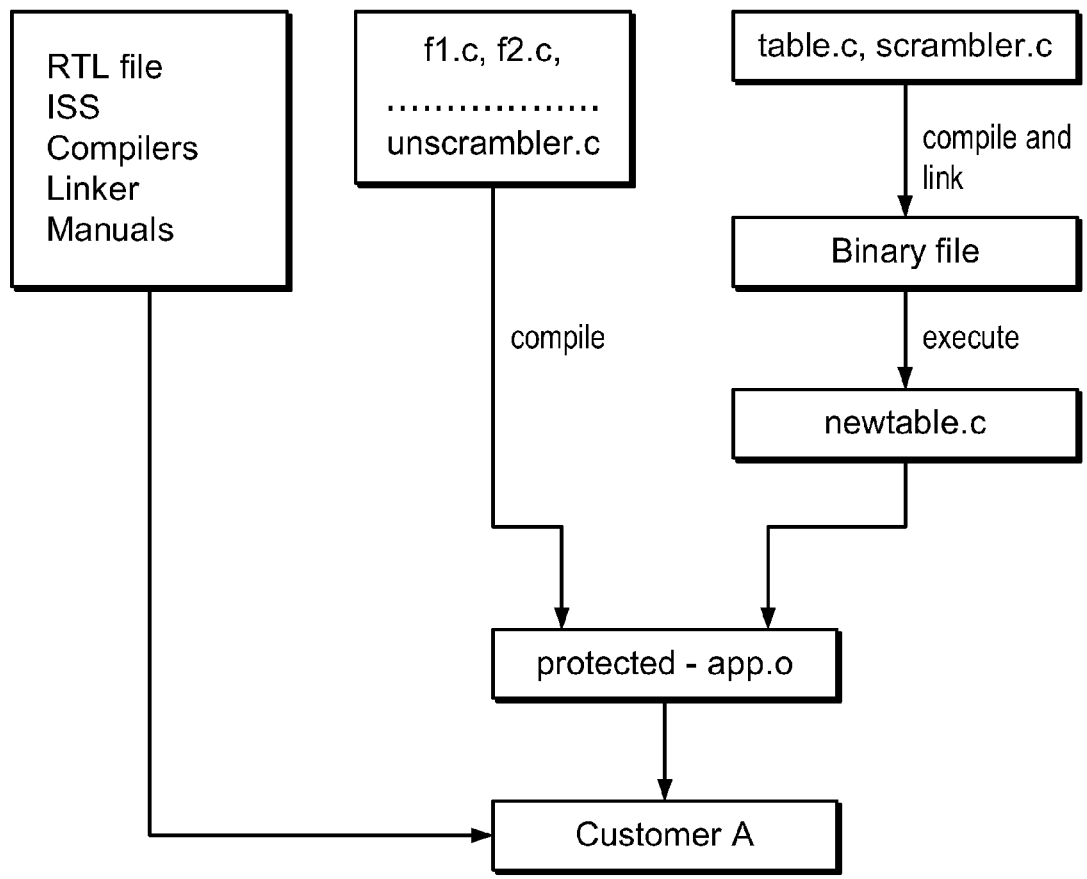
F I G. 4

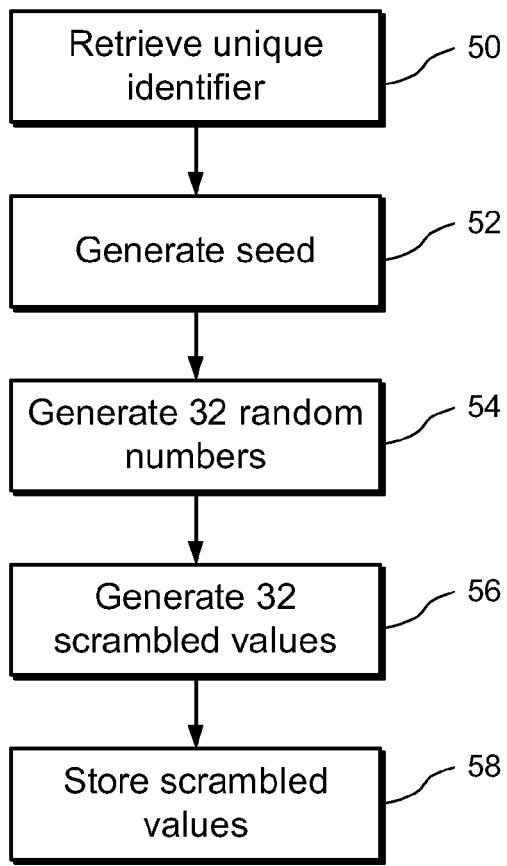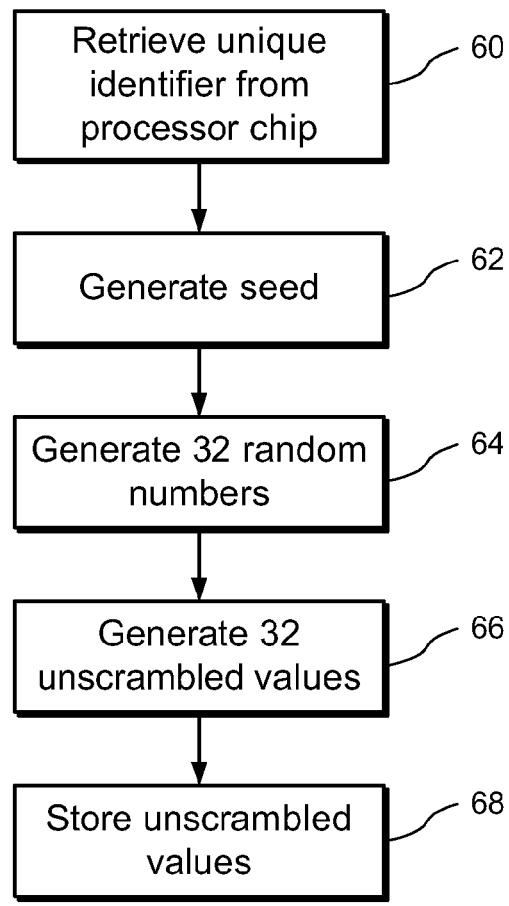
F I G. 5
F I G. 6

SYSTEM AND METHOD FOR PREVENTING PROPER EXECUTION OF AN APPLICATION PROGRAM IN AN UNAUTHORIZED PROCESSOR

FIELD OF THE INVENTION

The present invention relates to fraud prevention systems, and more particularly to a system for preventing proper execution of an unlicensed application program in a processor chip.

BACKGROUND OF THE INVENTION

Processor vendors sell manufactured processor chips to their customers. Each processor chip contains a processor core that executes the processor's base instruction set and various support circuitries such as cache memory and DMA controller to increase the execution speed of the processor instructions.

These processor chips are fixed in design which cannot be changed by any customer. By contrast, there are processor design vendors such as Tensilica Inc. of Santa Clara, Calif. which license processor designs that are customizable by customers prior to being manufactured as chips. Such processor design vendors receive a royalty payment from its licensed customers for every chip manufactured which incorporates the licensed customized processor design.

The customizable features include such things as DMA controller, floating point unit, cache memory type and size, power saving circuits and interfaces to external circuits. In some cases, even such features as special registers and processor instructions can be changed or added to the design.

Once the customized design is finalized and verified, the processor design vendor generates a processor design file such as an RTL (register transfer level) file that contains all of the necessary instructions to manufacture the processor core and other circuits that have been customized into a processor chip. The vendor also generates all of the support software including a compiler, assembler, disassembler, ISS (instruction set simulator) and the associated user manuals.

Referring to FIG. 1, the RTL file and the associated support software are provided to customers A and B under a license from the processor design vendor. While the RTL file may contain the same processor core for both customers, they may be different in their customized features. Each customer can then combine the customized processor design with other circuit designs (e.g., application specific logic) to further customize the design. The combined design is made into processor chips to be incorporated into a final product to be sold to the ultimate customers. For example, Customer A can be a DVD player manufacturer and the processor design licensed from the processor design vendor is incorporated into a chip to be finally assembled into DVD players. Other typical customers of customized processor chips may include manufacturers of computer printers, MP3 players, CD players, smart phones, video game players, personal digital assistants, personal computers, portable Internet devices such as netbooks, home theater receivers, digital televisions, ASIC controllers and the like.

Often, the processor design vendor and its customers may be interested in packaging useful application programs so that they may be provided in the ultimate product to be sold to the end users or customers. For example, customer A may be interested in offering a decoder program for decoding digitally encoded multimedia audio files in DTS (Digital Theater System) or Dolby format. This enables a user of the DVD player to listen to digitally encoded audio. Another example is an encoder that encodes the multimedia files.

As shown in FIG. 1, the processor design vendor under a license agreement with an application program vendor, e.g., DTS, Inc. of Agoura Hills, Calif., receives the application program in a source file format (such as C source file), optimizes the code for its processor core, and then supplies the optimized code typically in an object code format to the processor customers (e.g., customers A and B).

Although arrangements can vary, a processor design customer typically signs a license agreement with both the processor design vendor and the application program vendor. Like the processor design vendor, the application program vendor typically receives a royalty payment every time a processor chip packaged with the application program is made or sold.

However, there is a concern that the optimized application program provided to customer A, who has been licensed by the application program vendor, may fall into the hands of customer B who is not licensed by the same vendor. For example, a former employee of customer A who has a copy of the application program may start to work for customer B. It is possible that customer B may unethically decide to offer the application program without a license from the application program vendor even though the processor chip itself has been licensed by the processor design vendor. Since the processor core is the same for both customers, the application program will directly run properly on the hardware without any emulation software. In that case, the application program vendor would be unable to collect any royalty payment for chips that are sold by customer B.

To minimize this, the application program vendor attempts to test every type of processor chips that are being sold into the marketplace to ensure that all of the customers selling the licensed processor chips with the application program are in full compliance with royalty payments. For the application program vendor, this is very time consuming and expensive. It may even be impractical as there may be tens of thousands of chip types that are based on the licensed processor design which may be incorporated into final products that may be difficult to take apart and analyze.

Therefore, it would be desirable to provide a system and method for preventing an application program from being executed properly in any processor chip without a license from the application program vendor.

SUMMARY OF THE DISCLOSURE

According to the invention, a system for preventing an application program associated with an authorized processor from being executed properly in an unauthorized processor is provided. The system includes a scrambling module and a recovery module.

The scrambling module scrambles a selected portion of the application program using a first identifier which is at least partially unique to the authorized processor. The recovery module adds an unscrambling program to the application program containing the scrambled portion such that when the program is running in a processor, it retrieves a second identifier from that processor and unscrambles the scrambled portion of the application program using the retrieved second identifier.

If the second identifier does correspond to the first identifier associated with an authorized processor (e.g., the first and second identifiers match), the unscrambling operation will correctly unscramble the scrambled portion and the application program will run properly. Advantageously, if the second identifier does not correspond to the first identifier associated with an authorized processor, the unscrambling operation will not correctly unscramble the scrambled portion and the application program will not run properly.

BRIEF DESCRIPTION OF THE DRAWINGS

FIG. 1 illustrates a process by which a customized processor design and an associated application program become incorporated into a processor chip.

FIG. 2 is an exemplary block diagram of a computer system according to one embodiment of the present invention.

FIG. 3 illustrates a method for a processor design vendor to provide a licensed application program to a customer.

FIG. 4 illustrates a method for a processor design vendor to provide a licensed application program to a customer with a portion of the program scrambled according to one embodiment of the present invention.

FIG. 5 is a flow chart of a scrambling module for scrambling a portion of the application program according to one embodiment of the present invention.

FIG. 6 is a flow chart of an unscrambling program for unscrambling the scrambled portion of the application program according to one embodiment of the present invention.

DETAILED DESCRIPTION OF THE INVENTION

For purposes of this application, the terms "code", "program", "application", "software code", "software module", "module" and "software program" are used interchangeably to mean software instructions that are executable by a processor.

According to one embodiment of the invention, an application program to be executed under a licensed processor design contains a scrambled portion which has been scrambled by a scrambling module. When a chip containing the licensed processor design runs or executes the application program, an unscrambling program unscrambles the scrambled portion to its original content so that the program runs properly.

To do so, the scrambling module scrambles the application program based on a unique identifier that identifies the licensed processor design for a particular customer. In one embodiment, the unique identifier is specified within the RTL file being provided to a customer. This means that every processor chip made with the provided RTL file will contain that same identifier. Preferably, the identifier is retrievable with a specific processor instruction.

A recovery module adds an unscrambling program to the application program containing the scrambled portion. Then, the application program containing both the scrambled portion and an unscrambling program is provided to a customer.

At the execution time of the application program in a processor, the unscrambling program retrieves a unique identifier from the processor and unscrambles the scrambled portion of the application program using the retrieved identifier. If the retrieved identifier matches the original identifier that was used to scramble the application program, the program will be unscrambled correctly and will run properly. If not, the program will not be unscrambled correctly and will not run properly. Details of the invention will now be discussed below.

FIG. 2 is an exemplary block diagram of a computer system 10 for preventing an unauthorized version of an application program from running properly. The system 10 includes an input/output (I/O) interface 12 connected to an input device 14 such as a keyboard and mouse and a display device 16. The system 10 further includes a processor (processor chip) 18, such as a central processing unit (CPU), memory 20 for storing a scrambling module 22 and recovery module 24, external storage 26 all of which are connected to a bus 28. The scrambling module 22 contains software instructions that are executed by the processor 18 (e.g., by using an ISS) and they interact with a user through the input device 14. On the other hand, the recovery module 24 is generally not executed by the processor 18 and is simply provided to the customers as part of a licensed application program to be executed by a processor chip which has been manufactured based on a licensed processor design as will be explained in more detail with reference to FIG. 6.

It is to be appreciated that the computer system 10 may be any computer such as a personal computer, minicomputer, workstation, or even a mainframe.

FIG. 3 illustrates a way for a processor design vendor to provide a licensed application program to a customer. The processor design vendor optimizes the application program for the particular processor design to be provided to customer A. Among others, the optimized source code includes "f1.c", "f2.c" and "table.c" stored in the storage 26. In the embodiment shown, the table file "table.c" includes a table of constant coefficients that are used to perform a DCT (discrete cosine transform) based transform by a DCT section/stage, particularly a table of 32 coefficients k0 through k31 which is used by a cosine-modulated filtering operation to decode the digitally encoded multimedia signal into a PCM data stream.

The optimized source code is then compiled into an object code, e.g., "app.o" using a compiler for the processor design being licensed to customer A. Then, the optimized object code for the application program and all of the files related to the processor design (e.g., RTL file, ISS, C compiler, linker and user manuals) are provided to customer A.

As discussed earlier, however, the optimized application program provided to customer A can be executed in any processor design so long as the processor core is the same. Thus, another customer who is licensed by the processor design vendor, but is not licensed by the application program vendor may offer the application program without paying any royalty to the application program vendor.

To prevent such unethical behavior, the computer system 10 uses a scrambling module 22 to scramble a portion of the application program prior to providing the program to a customer. The steps of the scrambling module 22 are illustrated in FIG. 4.

As in FIG. 2, the optimized source code includes "f1.c", "f2.c" and "table.c" stored in the storage. In addition, however, the optimized source code now includes an unscrambling program "unscrambler.c", which is a part of the recovery module 24, and a scrambling module "scrambler.c" 22. As discussed in FIG. 2, the table file "table.c" includes a table of constant coefficients or values that are used to perform a DCT (discrete cosine transform) based transform to generate a PCM data stream. Accordingly, the portion of the application program being scrambled as shown in FIG. 2 is a data portion of the application program although scrambling of a code portion of the application program is possible.

Initially, two files "table.c" and "scrambler.c" are compiled and linked by a linker into an executable binary file. The executable binary file is then executed using an instruction set simulator (e.g., ISS) for the processor design being licensed. The scrambling module 22 ("scrambler.c") being executed changes the table of constants into a scrambled table "newtable.c". A flow chart of the scrambling module 22 for scrambling a portion of the application program is illustrated in FIG. 5. It should be noted that the scrambling module can be a series of manual steps performed by a human user.

The scrambling module 22 relies on an identifier that is at least partially unique to a licensed processor design such that all instantiated versions of the processor design include the same unique identifier. The identifier is used to scramble a portion of the application program and the code containing the scrambled version is provided to the customer. During execution of the application program in a processor chip which has been manufactured with the licensed design, the unique identifier is retrieved from the processor chip. The retrieved identifier is then used to unscramble the scrambled portion of the application program so that the code would run properly assuming that the retrieved identifier matches the identifier that was used to scramble the application code.

The unique identifier can be a number, a set of numbers, alphanumeric characters, ascii characters, a special unique processor instruction or a set of processor instructions, or a combination thereof.

In the embodiment shown, the present invention uses a special 32 bit register that holds a unique number that at least partially identifies the processor design being licensed to a particular customer. The RTL file includes instructions to build a special register with a fixed non-volatile number and to build a processor instruction (opcode) which retrieves the value stored in the special register.

Referring to FIG. 5, in step 50, the scrambling module 22 retrieves the unique identifier which identifies the particular processor design being licensed to a customer. The identifier can be retrieved from examining the RTL file to be provided to the customer, from a customer database that contains a table of unique identifiers for all licensed processor designs, or entered manually by a user through the input device 14 in response to a prompt.

In step 52, the identifier is used to generate a seed value. One example would be to add a fixed value to the identifier. Alternatively, the identifier itself can be used as the seed value. Still in another embodiment where the identifier consists of multiple numbers, the numbers can be logically combined (e.g., AND operation) to generate the seed value.

In step 54, a pseudo-random number generator is used to generate a set of random numbers R0-R31 based on the seed value obtained from step 52. In step 56, the scrambling module 22 generates 32 scrambled values based on the random numbers R0-R31 and the constant values k0-k31 from "table.c". In the embodiment shown, the constant values k0-k31 are XOR'ed with respective random numbers R0-R31 (e.g., k0 XOR'ed with R0).

The seed value generation and pseudo-random number generation ensure that even if the identifiers for processor chips from customer A and customer B are substantially identical (e.g., they differ only by 1 bit), the scrambled data is sufficiently unique so that the application program scrambled for customer A's chip does not run properly on customer B's processor chip.

Alternatively, the scrambled values can be generated in many different ways such as by simply adding the value of the unique identifier to the 32 constant values and then at execution time subtracting the unique value from the scrambled values.

In step 58, the scrambled values are stored in a file called "newtable.c" as shown in FIG. 4.

Referring back to FIG. 4, the recovery module 24 compiles the scrambled table "newtable.c" with the remaining application program codes "f1.c", "f2.c" and "unscrambler.c". The compiler generates the object code "protected-app.o" which includes the scrambled table and the unscrambling program (binary version of "unscrambler.c").

Then, the optimized object code for the application program containing the scrambled portion and the unscrambling program, and all of the files related to the processor design (e.g., RTL file, ISS, C compiler, linker and user manuals) are provided to customer A.

As discussed above, the licensed processor design is manufactured into a processor chip. When the licensed application program is running in the processor chip, the scrambled portion of the program needs to be unscrambled by an unscrambling program (contained in the recovery module 24) which was provided to customer A as part of the application program. A flow chart of the unscrambling program for unscrambling the scrambled portion is illustrated in FIG. 6 according to one embodiment of the invention.

In the embodiment shown, the unscrambling program is very similar to the scrambling module 22, except the step for retrieving the unique identifier. In step 60, the unscrambling program retrieves the identifier by invoking a processor instruction for retrieving data stored in a special register of the processor chip that is running the application program.

In step 62, the identifier retrieved from the processor chip's special register is used to generate a seed value similar to step 52. In step 64, similar to step 54, the same pseudo-random number generator that was used in step 54 is used to generate a set of random numbers U0-U31 based on the seed value obtained from step 62. In step 66, the unscrambling program generates 32 unscrambled values based on the random numbers U0-U31 and the constant values k0-k31 that were obtained from "newtable.c". In the embodiment shown, similar to step 56, the constant values k0-k31 are XOR'ed with respective random numbers U0-U31 (e.g., k0 XOR'ed with U0). In step 68, the constant values k0-k31 which were the scrambled portion of the application program are replaced with the unscrambled values so that the application program executes properly in the processor chip.

Suppose that customer A uses the licensed processor design and licensed application program to produce a processor chip which has been designed into a DVD player. When a user watches a multimedia file that contains digitally encoded data, the processor chip executes the application program to decode the encoded data. While decoding, the application program can execute the unscrambling program once to restore the scrambled table of values. Alternatively, the unscrambling program can be executed each time there is a call to decode a frame of data. In either case, each processor chip manufactured by customer A contains the same identifier that was used to scramble the table of values "table.c" by the scrambling module 22. Consequently, the unscrambling program will be able to recover the original table of values from the scrambled table "newtable.c" and properly decode the multimedia file.

Suppose, however, that an unethical engineer at customer B takes the object code of the application program from customer A and tries to offer it with a processor chip based on its own licensed processor design, but without a license from the application program vendor. As discussed above, any processor chip that has been manufactured with a licensed processor design for customer B would have a unique identifier which is different from that for customer A even though the processor core may otherwise be the same. During the recovery process, because the table of constants was scrambled using a different identifier than that for customer B, the unscrambling program will not be able to recover the table of constants correctly. This results in a decoded file that is garbled. In other words, the application program will not run or execute properly. If the multimedia file is an image file, the image would be blurred even if it can be recognizable. If the multimedia file is an audio file, the quality of sound produced will be very poor.

The foregoing specific embodiments represent just some of the ways of practicing the present invention. Many other embodiments are possible within the spirit of the invention. For example, the scrambling and recovery module can use encryption keys such as a public/private key pair to respectively encrypt and decrypt a portion of the application program. Other embodiments may also use more complicated crypto algorithms such as DES, AES, or the like. Also, constant coefficients for different DSP processing phases such as FFT and FIR/IIR filters can be scrambled. Accordingly, the scope of the invention is not limited to the foregoing specification, but instead is given by the appended claims along with their full range of equivalents.

What is claimed is:

1. A method for preventing an application program associated with an authorized processor from being executed properly in an unauthorized processor, the method comprising:
   scrambling, by a scrambling module, a selected portion of the application program using a first identifier at least partially unique to the authorized processor to generate a scrambled portion;
   adding, by a recovery module, an unscrambling program to the application program that contains the scrambled portion;
   executing, by a processor, the application program;
   determining, by the unscrambling program, if a second identifier received from the processor matches the first identifier, wherein if the second identifier matches the first identifier, the processor is authorized and the scrambled portion of the application program is unscrambled to enable the application program to execute on the processor, further wherein if the second identifier is different from the first identifier, the processor is unauthorized and the scrambled portion of the application program is not unscrambled to prevent the application program from executing on the processor,
   unscrambling the scrambled portion of the application program.

2. The method of claim 1, wherein:
   the second identifier is stored in a register of the processor executing the application program; and
   the unscrambling program, being executed in the processor, retrieves the second identifier using a processor instruction to access the register.

3. The method of claim 1, wherein:
   the application program is a decoder program that decodes a digitally encoded multimedia data into a decoded multimedia data;
   the decoder program contains a constant table of values that are used to decode the digitally encoded multimedia data; and
   scrambling the selected portion of the application program using the first identifier further includes scrambling the values in the constant table using the first identifier.

4. The method of claim 3, wherein:
   the decoder program contains a discrete cosine transform (DCT) section that uses the constant table of values; and
   scrambling the selection portion of the application program using the first identifier further includes scrambling the values in the constant table which is used by the DCT section.

5. The method of claim 4, wherein scrambling the selection portion of the application program using the first identifier further includes using a pseudo-random number generator to scramble the values in the constant table by using the first identifier as a seed.

6. The method of claim 1, wherein:
   the application program is an encoder program that generates a digitally encoded multimedia data from an unencoded multimedia data;
   the encoder program contains a constant table of values that are used to encode the unencoded multimedia data; and
   scrambling the selection portion of the application program using the first identifier further includes scrambling the values in the constant table using the first identifier.

7. The method of claim 1, wherein the processor includes a processor chip, and wherein the processor chip includes a processor core configured to execute a base instruction set for the processor.

8. The method of claim 1, wherein a processor design file specifies the first identifier.

9. The method of claim 8, wherein the receiving the processor design file is a register transfer level (RTL) file that specifies the first identifier.

10. The method of claim 1, wherein the second identifier is at least partially unique to the processor.

* * * * *